United States Patent [19]

Sakakibara et al.

[11] Patent Number: 4,823,199
[45] Date of Patent: Apr. 18, 1989

[54] STILL VIDEO ADAPTER DEVICE DETACHABLE TO A CAMERA BODY

[75] Inventors: Kuniteru Sakakibara, Amagasaki; Mitsuru Saito, Ibaraki; Tetsuyuki Tanimoto; Yasuhiro Morimoto, both of Takatsuki; Hiroshi Ishibe, Kyoto, all of Japan

[73] Assignee: Minolta Camera Kabushiki Kaisha, Osaka, Japan

[21] Appl. No.: 24,702

[22] Filed: Mar. 11, 1987

[30] Foreign Application Priority Data

| Mar. 11, 1986 | [JP] | Japan | 61-36821[U] |
| Mar. 11, 1986 | [JP] | Japan | 61-36822[U] |
| Mar. 11, 1986 | [JP] | Japan | 61-36824[U] |
| Mar. 11, 1986 | [JP] | Japan | 61-36825[U] |
| Mar. 11, 1986 | [JP] | Japan | 61-36826[U] |
| Mar. 11, 1986 | [JP] | Japan | 61-36827[U] |
| Mar. 11, 1986 | [JP] | Japan | 61-36829[U] |

[51] Int. Cl.$^4$ .................................................. H04N 5/76
[52] U.S. Cl. ..................... 358/335; 358/906; 358/909
[58] Field of Search ............... 358/906, 909, 310, 335, 358/213.11, 213.13, 213.19; 360/33.1, 35.1; 354/429, 432, 416, 417, 422, 423, 420, 421

[56] References Cited

U.S. PATENT DOCUMENTS

| 4,130,834 | 12/1978 | Mender et al. | 358/906 |
| 4,303,322 | 12/1981 | Someya | 354/31 |
| 4,366,501 | 12/1982 | Tsunekawa et al. | 358/310 |
| 4,514,073 | 4/1985 | Taniguchi et al. | 354/414 |
| 4,527,205 | 7/1985 | Konishi | 360/35.1 |
| 4,551,764 | 11/1985 | Ogawa | 358/906 |
| 4,558,939 | 12/1985 | Taniguchi et al. | 354/416 |
| 4,572,638 | 2/1986 | Nakai et al. | 354/286 |
| 4,584,598 | 4/1986 | Kutaragi | 358/906 |
| 4,599,657 | 7/1986 | Kinoshita et al. | 358/906 |
| 4,638,365 | 1/1987 | Kato | 354/429 |
| 4,693,111 | 1/1987 | Harvey | 354/195 |
| 4,714,966 | 12/1987 | Saito et al. | 358/335 |

FOREIGN PATENT DOCUMENTS

| 58-57868 | 4/1983 | Japan . |
| 59-104132 | 7/1984 | Japan . |
| 60-50568 | 4/1985 | Japan . |

OTHER PUBLICATIONS

Canon USA, "Canon T-90".
The Journal of the Institute of Television Engineers of Japan, vol. 39, No. 9, 1985, pp. 765-770.

Primary Examiner—Donald McElheny, Jr.
Attorney, Agent, or Firm—Burns, Doane, Swecker & Mathis

[57] ABSTRACT

A still video adapter device is detachably mounted to a back portion of a camera body, in place of a rear cover. The light passing through an objective lens of the camera body is relayed by a relay optical system and split into two groups, one being directed to an image sensor for the still video photography, the other to a light measuring element for the exposure control. The output of the light measuring element is integrated and compared with a given value, thereby generating a signal for interrupting the flash light emission when the integrated value reaches the given value.

7 Claims, 12 Drawing Sheets

STILL VIDEO ADAPTER DEVICE DETACHABLE TO A CAMERA BODY

BACKGROUND OF THE INVENTION

1. Field of the Invention

The present invention relates to a still video adapter device having an image sensor for still video photography detachably mounted to a back portion of a camera body in place of a rear cover of the camera body, and particularly pertains to such a still video adapter device capable of interrupting or stopping the flash light emission in accordance with the amount of flash light projected from an electronic flash device to an object to be photographed, reflected by the object and incident through an objective lens of the camera body onto the image sensor.

2. Description of the Prior Art

A camera system has been proposed in a Japanese laid open utility model application No. 59-104132, wherein the camera system is composed of a camera housing including a photography optical system, a film photography unit including a film, a film transfer mechanism, a rear cover, a still video photography unit including an image sensor, a relay optical system for the image sensor and a recording device such as a floppy disk, the film photography unit and the still video photography unit being selectively mounted to the camera housing. In this prior art, the camera system is used for an original film type camera when the film photography unit is mounted to the camera housing and a still video camera when the still video photography unit is mounted to the camera housing. However this prior art does not disclose the construction or manner of controlling the amount of flash light when the still video photography unit is mounted to the camera housing.

Many cameras have been proposed wherein camera bodies are provided with a photocell for directly measuring a reflected flash light passing through an objective lens and reflected from the surface of a film and a flash light control circuit for integrating the output of the photocell and generating a signal instructing the interruption or termination of the flash light emission when the integrated amount reaches to a given level expected to provide a proper exposure. It may be considered to form a still video camera system by detachably mounting a still video adapter device having an image sensor to a back portion of the conventional camera body having such flash light control circuit, in place of a rear cover of the conventional camera, and to control the interruption of the flash light emission by means of the output of the flash light control circuit. However, in such still video camera system, the photocell for the flash light control circuit receives little light because a relay optical system for relaying the image formed at a film plane to the image sensor is disposed in the vicinity of the film plane and has very little reflectance, thereby causing the flash light control circuit to be inoperative.

SUMMARY OF THE INVENTION

It is an object of the present invention to provide a still video adapter device detachably mounted to a back portion of a camera body originally for the film exposure in place of a rear cover, which ensures a proper exposure.

A further object of the present invention is to provide such still video adapter device which can control the amount of flash light for the still video photography.

Another object of the present invention is to provide a still video adapter device detachably mounted to a conventional camera body which is useful in still video photography.

A still video adapter device according to the present invention is detachably mounted to a back portion of a camera body originally split for the film exposure in place of a rear cover, and provided with a relaying optical system for relaying and reimaging an image formed by an objective lens of the camera body onto an image sensor, a splitting member for splitting the light to be incident on the image sensor, and a photocell which receives for the exposure control the light split by the splitting means.

Accordingly, the light passing through the objective lens of the camera body and incident onto the image sensor is split by the splitting member and measured by the photocell for the exposure control, the amount of split light being in proportional to the amount of light incident to the image sensor. In other words, the photocell can measure the amount of light actually received by the image sensor. Accordingly, exposure control for a proper exposure such as the interruption of a flash light emission can be properly carried out in accordance with the output of the photocell.

BRIEF DESCRIPTION OF THE DRAWINGS

These and other objects, features and advantages of the present invention will become more apparent upon reading of the following detailed specification and drawings.

DETAILED DESCRIPTION OF THE PREFERRED EMBODIMENT

Figure 1:
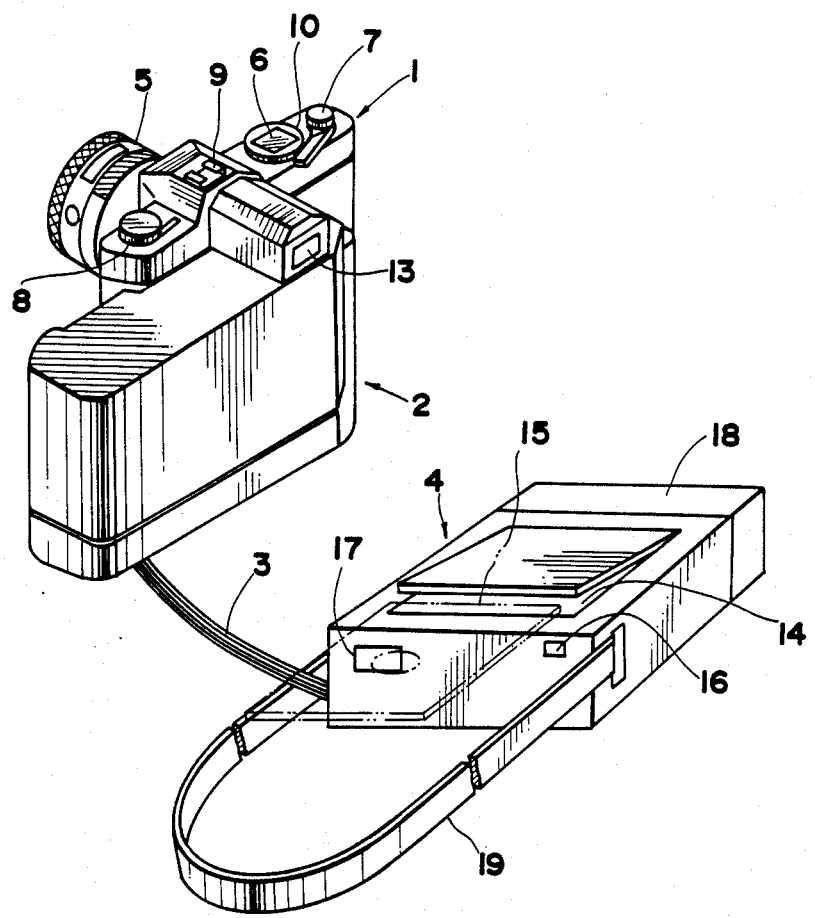
FIG. 1 is perspective view of a photographic camera coupled with a still video adapted device according to one embodiment of the present invention.

In the following, explanation will be made about a preferred embodiment of the present invention with reference to the drawings. FIG. 1 is a perspective view showing a camera body 1 of a single lens reflex camera coupled with a still video adapter device 2 (hereinafter referred as to a still video back). The still video back 2 is connected to a still video recorder 4 through a camera cable 3. An interchangeable lens 5 is attached to the front portion of the camera body 1 which in turn is provided, on its top, with an exposure factor display window 6, a wind-up lever 7, a rewinding knob 8 and, an accessory shoe 9 for the coupling with a flash device and an exposure mode setting dial 10. The still video back 2 is provided, at its back, with a viewfinder observing window 13 to which the viewfinder image of the camera body 1 is relayed. The still video recorder 4 is provided with a cassette receiving opening through which a still video floppy disk 15 is inserted into and held within the recorder, a cassette ejecting button 16 for taking out the floppy disk, a counter 17 for displaying the number of exposed or picture taken frames of the still video floppy disk, a power source 18 for the still video recorder 4 and the still video back 2, and a carrying belt 19 for carrying the video recorder 4.

Figure 2:
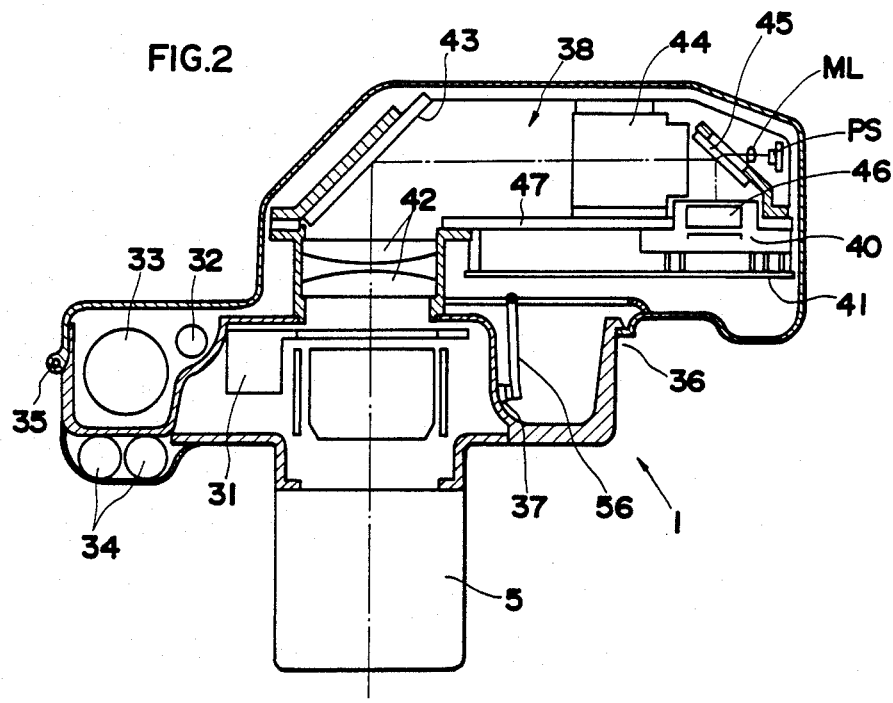
FIG. 2 is a horizontal cross sectional view of the photographic camera coupled with the adapted device.
Figure 3:
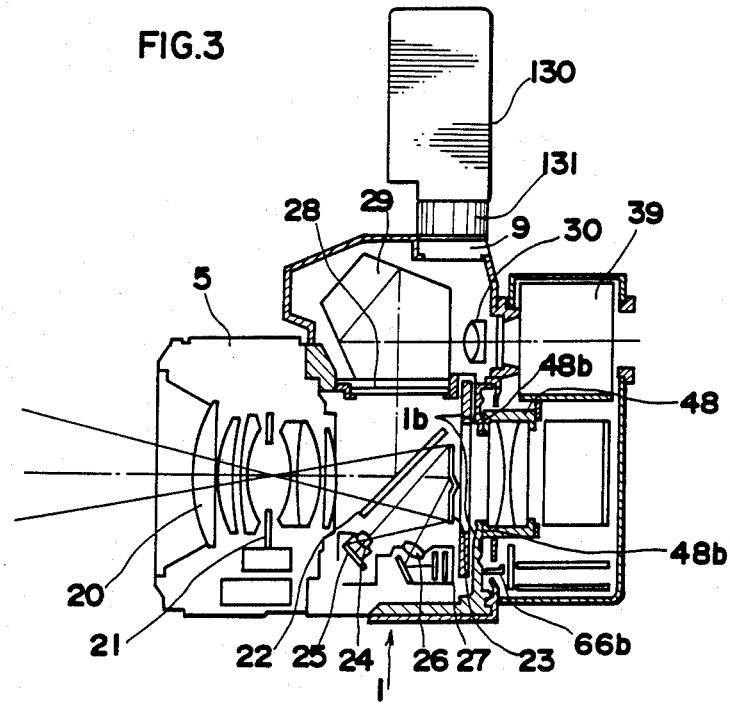
FIG. 3 is a vertical cross sectional view of the device of FIG. 2.

FIGS. 2 and 3 are horizontal and vertical cross sectional views of the camera body 1 of the single lens reflex camera with the still video back 2 attached thereto. As shown in FIG. 3, the interchangeable lens 5 is provided with a lens system 21, a diaphragm 20, a diaphragm driving mechanism and a lens driving mechanism which mechanisms are driven through mechanical interlocking with the driving mechanism in the camera body 1. The camera body 1 is provided with a half or semi-transparent mirror 22 for the viewfinder, a reflecting mirror 23 for light measurement and focus detection, a light measuring lens 24 and a photocell 25 for the measurement of ambient and flash light, a lens 26 and a CCD line sensor 27 for the focus detection. The camera viewfinder system is composed of a focusing screen 28, a pentagonal prism 29 and an eyepiece 30. Besides the above, the camera body 1 is provided with a shutter mechanism 31, a sprocket 32 for winding up a film, a spool 33 and a battery 34 for the camera body 1. The camera body 1 is provided with a hinge connector 35 and a lock 36 by which the camera rear cover is detachably connected to the camera body 1. According to the present invention, the still video back 2 can be attached to the camera body 1 in place of the camera rear cover through those hinge connector 35 and the lock 36. On the inner wall of the film cassette chamber of the camera body 1, switch contacts 37 of five bits for film speed data inputting are provided such that the film speed data is automatically input to the camera circuit.

The still video back 2 comprises a relay optical system 38, a relaying viewfinder system 39 and a CCD signal processing circuit board 41. The relay optical system 38 serves to project the 35 mm size image of the camera body 1 onto the CCD of the size, for example ⅔ inch, reducing the image. The relay optical system 38 comprises a condenser lens 42, a first reflecting mirror 43; an image forming lens bock 44, a second reflecting mirror 45 and an optical low pass filter 46 and the image on a plane where a film is to be located, is reduced to ⅓ or ½ of the original and projected onto the CCD sensor 40. The relaying viewfinder system 39 serves to shift the eyepoint of the camera viewfinder to the rear of the still video back 2. The CCD signal processing circuit board 41 includes a CCD image sensor 40.

Figure 4A:
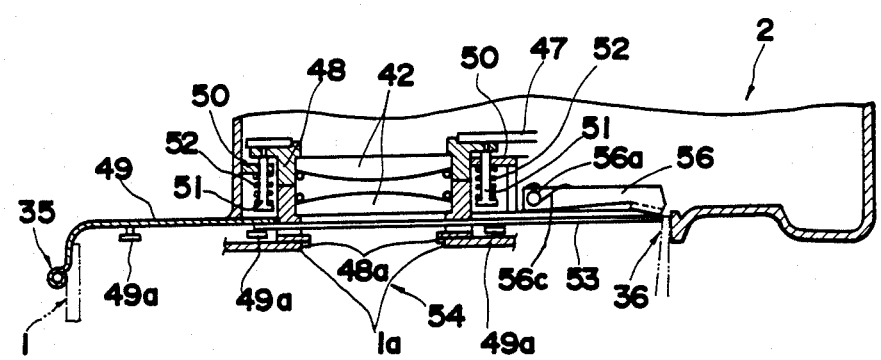
FIG. 4(a) is a horizontal cross sectional view of the main portion of the adapter device.
Figure 4B:
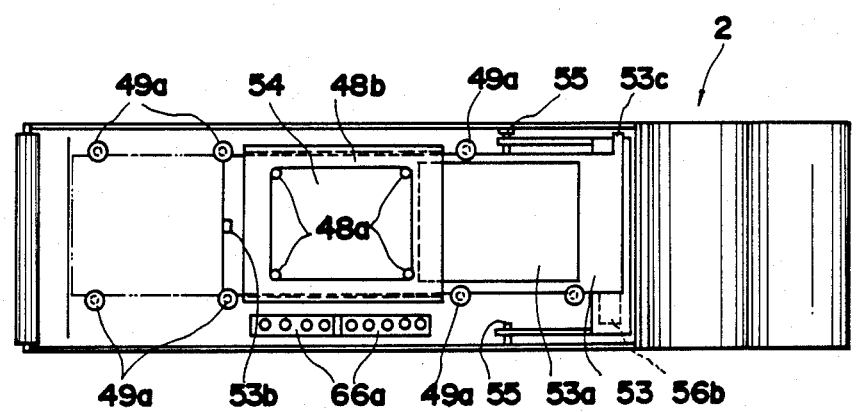
FIG. 4(b) is a front elevational view of the adapter device.

FIG. 4(a) is the cross sectional view of the main portion of the still video back 2 and FIG. 4(b) is the front elevational view of the same. The still video back 2 is detachably connected to the camera body 1 by means of the aforemention hinge connector 35 and the lock 36. The optical members and the CCD sensor 40 of the still video back 2 are all fixed on an optical base plate 47 and the focusing on the CCD sensor 40 is adjusted by fine adjustment of the image forming lens (44). A condenser holder 48 fixed on the base plate 47 is provided with pins 48a which are positioned with respect to the exposure frame 1a of the camera body 1 and a standard abutting surface 48b which comes into contact with the rail planes 1b which serve to guide a film. (see FIG. 3)

Guide pins 51 carried by the holder 48 are back-and-forth movably guided in three or four guide holes formed on a guide base plate 50 fixed on a back base plate 49 which in turn is provided with the hinge connector 35 and the lock 36. Springs 52 put around the guide pins 51 respectively press the holder 48 against the rail plane 1b. When the lock 36 is released and the still video back 2 is detached from the camera body 1, the urging force of the springs 52 bring the rear flange of the holder 48 into contact with the guide plate 50 and the holder 48 is secured.

As a matter of the construction of the still video back 2, the condenser lens 42 must be located in the vicinity of the focal plane of the camera body 1 so that it will be likely to occur that the optical element is accidentally touched by a finger of a person and a finger-print is marked thereon, or that a dust attaches to the surface of the element whereby the shadow of the finger-print or the dust is projected onto the CCD sensor. To prevent this, the back base plate 49 is provided with the shutter 53. FIG. 4 shows the condition when the opening of the picture frame 54 of the still video back 2 is closed. The shutter 53 is formed with an opening 53a and a knob 53b and is guided by guide pins 49a of the back base plate 49 and guide grooves of the holder 48. When the knob 53b is moved to the left manually, the opening 53a of the shutter is brought into registration with the picture frame 54 to open the latter.

The back base plate 49 carries a pin 55 which rotatably supports substantially U-shaped lever 56 which is formed with a pivoting hole 56a receiving the pin 55 and serves for the inputting of the sensitivity data. The lever 56 is provided on its free end with a sensitivity representing pattern 56b in the form of a metalized coating. In practice, the pattern 56b may be formed as disclosed in a Japanese laid-open patent application No. 60-158424 such that five-bit contacts may identify 24 kinds (ISO 25 through 5000) of sensitivity.

In the present embodiment, as the relay optical system 38 reduces the image on the plane corresponding to the film plane, and projects the reduced image onto the CCD sensor 40, the sensitivity recorded on the lever 56 in the form of sensitivity representing a digital pattern is set higher than the actual sensitivity of the CCD sensor 40. The set sensitivity is calculated by dividing the actual sensitivity of the CCD sensor 40 by the square of the rate of the reduction of the image by means of the relay optical system 38 or subtracting form the divided value, the value corresponding to the energy loss by the relay optical system 38.

When the shutter 53 is closed as shown in FIG. 4, its driving portion 53c turns the lever 56 counterclockwise as viewed in the Figure against the force of spring 56c and the lever 56 is put into the still video back 2. When the shutter 53 is opened, the lever 56 follows the driving portion 53c under the urging force of the spring 56c and the sensitivity representing pattern 56b is brought into contact with the switch contacts 37 on the camera body upon completion of the shutter opening to enable the input of the sensitivity data.

Figure 5:
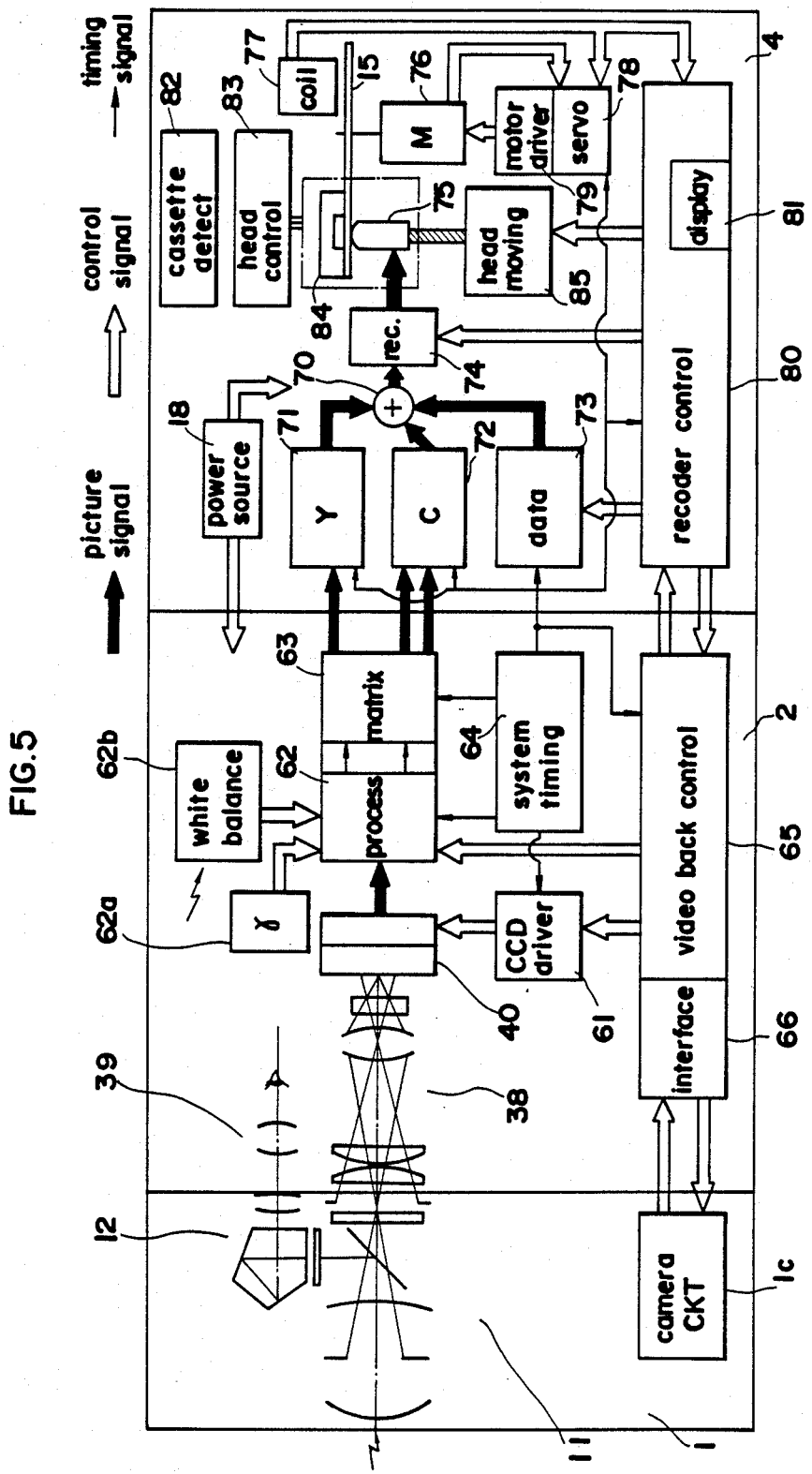
FIG. 5 is a block diagram showing the general construction of a still video camera system employing the adapter device.

FIG. 5 is a block diagram showing the general construction of the still video camera system. As described before, the system of the present embodiment is composed of independent blocks of the camera body 1, the still video back 2 and the still video recorder 4. The camera body 1 comprises a picture taking optical system 11 including the objective lens, the diaphragm, the shutter and exposure control mechanism for controlling those, the viewfinder optical system 12 including a reflex mirror, the focusing screen, the pentagonal prism and the eye piece, and a camera circuit 1c for generally controlling the operation of the camera. The still video back 2 comprises the relay optical system 38, the relaying viewfinder system 39, the CCD sensor 40 including a photoelectric converter section and signal transfer section, and a signal processing circuit for the CCD sensor. The CCD signal processing circuit includes a CCD driver circuit 61 for transferring and outputting the picture signals from the CCD sensor 40, a process circuit 62 for deriving G signal (green signals) and R/B signals (line sequential signals for red and blue) from the picture signal transferred and output from the CCD sensor 40 by the CCD driver circuit 61, a matrix circuit 63 to form brightness signal Y and color difference signals R-Y and B-Y from the outputs of the process circuit 62, and system timing circuit 64 for controlling the timing of the operation of the above mentioned circuits. To the process circuit 62 are added a well-known gamma compensation circuit 62a and a white blank circuit 62b. A video back control circuit 65 serves to generally control the operation of the still video back 2. A camera interface 66 receives from the camera and input to the video back control circuit 65, serial data of a shutter speed value Tvc, a diaphragm aperture value Avc, object brightness Bvc and so forth, and signals representing the operations of a camera light measuring switch S1, a release switch S2, a shutter closure completion switch S4 and so forth. The camera interface 66 returns to the camera exposure data (TVB, AVB) that have been subjected to calculation and corrected or adjusted in the video back control circuit 65, and a shutter release inhibiting signal. The input/output terminals 66a of the camera interface 66 are arranged below the lower edge of the picture frame 54 of the still video back 2 as shown in FIG. 4 and are adapted to come into contact with input/output terminals 66b of the camera body 1, which have been originally provided on the camera body 1 for the connection with a data imprinting device or a program back. The program back is a kind of control back to be replaced with the camera rear cover to provide a function to enable the camera user to set a desired program of exposure control and other functions.

The still video recorder 4 includes a Y signal processing circuit 71 for processing the brightness signal Y and the color difference signals R-Y, B-Y from the CCD signal processing circuit such that those signals adapt to the general standard for still video floppy disks. The still video recorder 4 further includes a C signal processing circuit 72 and a multiplex circuit 73 for multiplying data signals on the video signals. The data signals to be multiplied on the video signals may be signal FD/FM for the determination of field record and frame record, a track number signal, a date signal and so on.

The outputs of the circuit 71, 72 and 78 are mixed up by a mixer circuit 70 and input to the electromagnetic record head 75 through recording circuit 74.

The still video floppy disk 15 is driven by a spindle motor 76 to rotate at a speed of 3600 rpm which complies with the general standard. The rotation of the spindle motor 76 is controlled by a PG coil 77 which generates pulses in accordance with the rotation of the motor, a servo circuit 78 and a driver circuit 79. A recorder control circuit 80 controls the still video recorder 4 in response to the control signals from the video back control circuit 65. The recorder control circuit 80 is provided with a display circuit 81. The still video recorder 4 further comprises a mechanism which highly precisely positions the cassette of the still video disk 15. When the cassette is inserted and the positioning of the cassette is completed, a cassette insertion detector 82 generates a positioning detection signal. The reference numeral 83 denotes a head abutment control section, reference numeral 184 denotes a pad, and the numeral 85 denotes a head movement drive circuit. The still video recorder 4 is provided with a power source 18 of a dry battery or a rechargeable battery. The power source 18 provides driving power for the still video recorder 4 and the still video dack 2.

Figure 6:
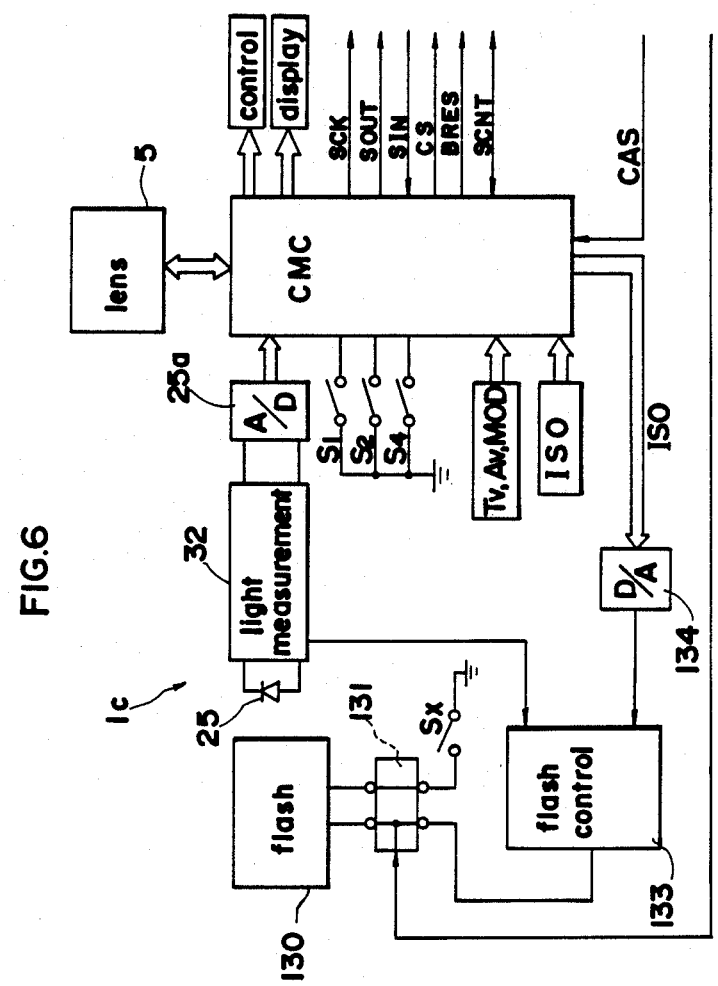
FIG. 6 is a block diagram showing the circuit construction of the camera portion of the system.
Figure 7:
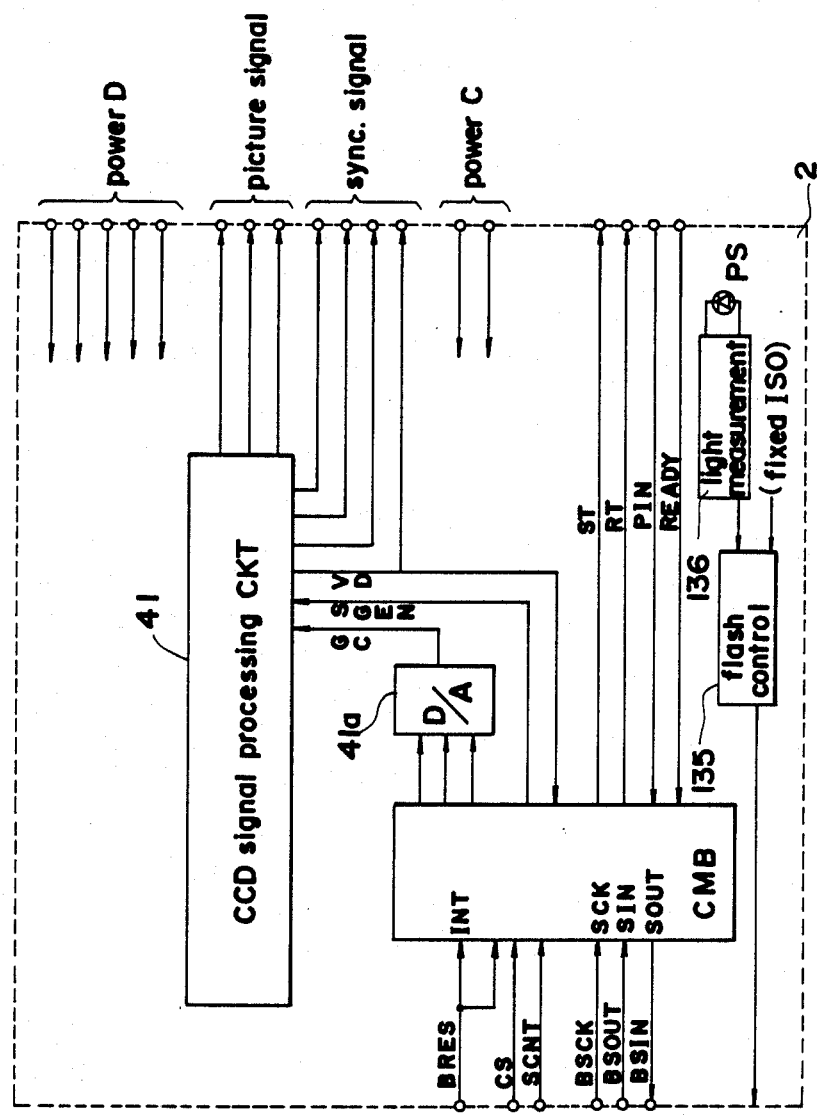
FIG. 7 is a block diagram showing the circuit construction of the adapter device portion of the system.
Figure 8:
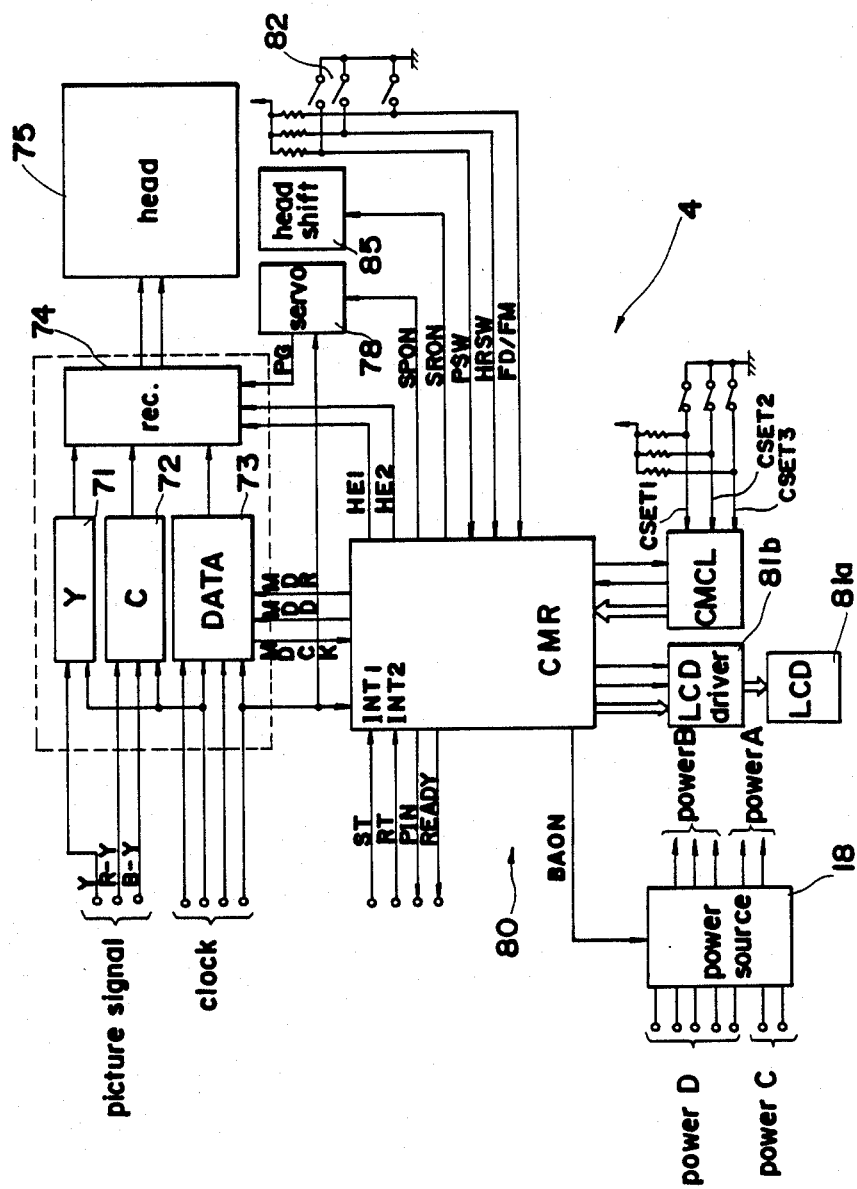
FIG. 8 is a block diagram showing the circuit construction of the video recorder portion of the system.

FIG. 6 is a block diagram of the camera circuit 1c in the camera body 1. FIG. 7 is a block diagram showing the circuit construction of the still video back 2. FIG. 8 is a block diagram showing the circuit construction of the still video recorder 4. A camera control microcomputer CMC in FIG. 6 is a microcomputer for generally controlling the camera body 1. The back control microcomputer CMB in FIG. 7 is a microcomputer for generally controlling the still video back 2. The recorder control microcomputer is a microcomputer for generally controlling the still video recorder 4.

First, explanation will be made about the operation of the camera control microcomputer CMC. The camera control microcomputer CMC is activated by the operation of the light measuring switch S1, the release switch S2, switches for setting the exposure parameters TV, AV and exposure control mode, a film speed setting key ISO and so forth. When the light measuring switch S1 is closed, the camera control microcomputer CMC starts light measuring operation. The output of the photocell 25 is input to the camera control microcomputer CMC through an A/D converter 25a to obtain the measured value of an object brightness. Exposure data TVC and AVC are calculated from the light measurement value, the set exposure mode, and the ISO film speed value input from the still video back 2 in the form of CAS code signal. Then, the camera control microcomputer CMC transmits serially the data of the light measurement value and the calculated exposure values as serial output signals SOUT in synchronization with clock pulses SCK. Then, the camera control microcomputer CMC receives the data of the corrected exposure value TVB and AVB that have been corrected by the back control microcomputer CMB, back available range determining signal NCONTB and release allow/inhibit signal RELENB and so forth. Those data are received as serial input signals SIN in synchronization with the clock signals SCK and are displayed on the display section of the camera body if necessary. The camera control microcomputer CMC enables the receiving of the signal input from the release switch S2 when the release allow/inhibit signal RELENB represents the release allowance. The camera control microcomputer CMC repeats the series of operations of the above mentioned light measurement, exposure calculation, data exchange and the display while the light measuring switch S1 is being closed and for a given time after the light measuring switch S1 is turned off. Those operations will be referred to as light measuring cycles hereinafter.

Figure 9:
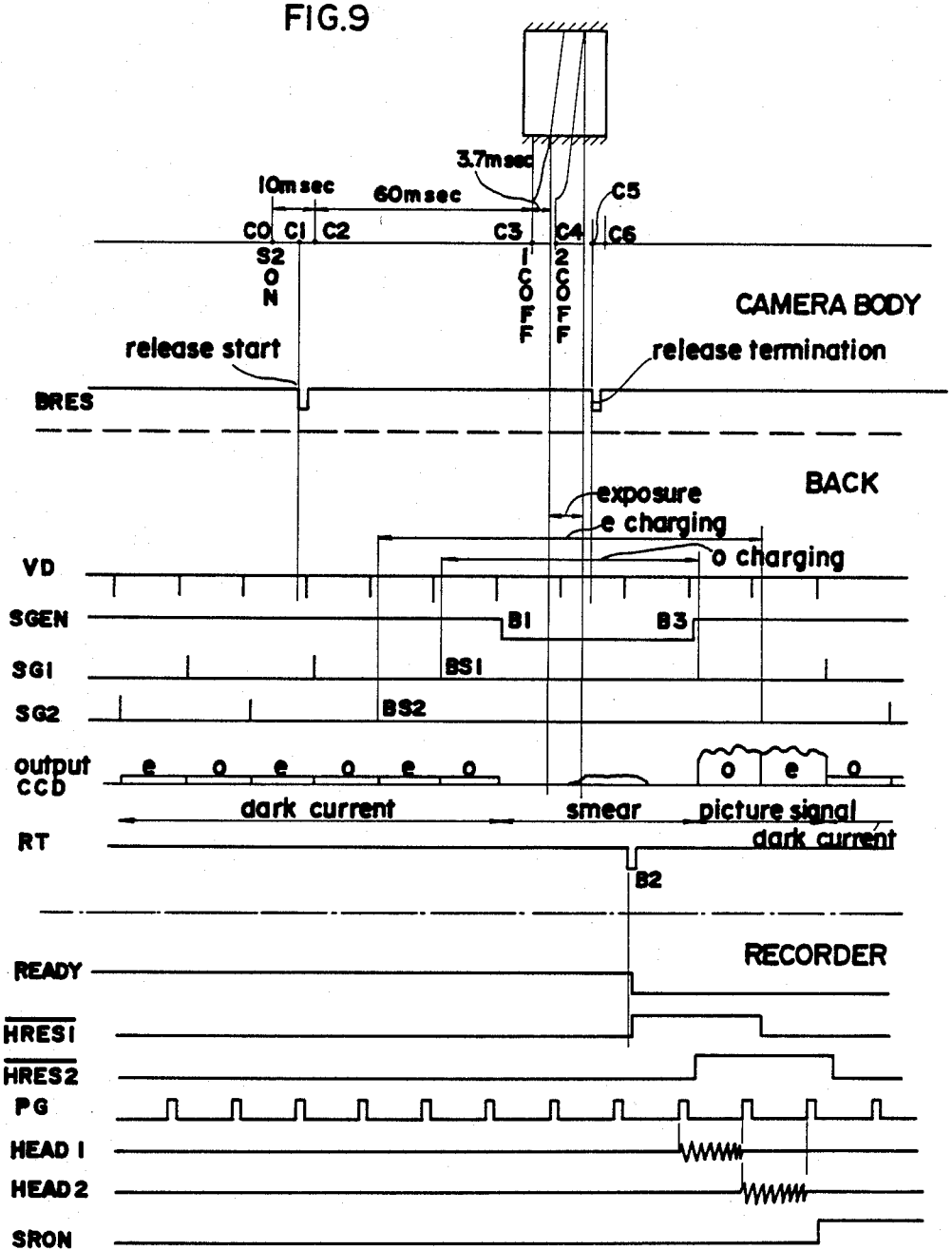
FIG. 9 is a time chart showing the timing of operation of the above mentioned embodiment.

If the release switch S2 is closed under the condition that the camera control microcomputer CMC has been received, a release allowing signal from the back control microcomputer CMB in the light measuring cycle to be ready to receive the input signal from the release switch S2 and that the camera mechanism has been cocked to turn off a switch S4, the camera control microcomputer CMC enters release operation at the time C0 of FIG. 9 wherein the camera control microcomputer CMC energizes the release electromagnet (at timing C2 in FIG. 9), sets the diaphragm aperture and lifts the main and sub mirrors After a predetermined time (at timing C3 in FIG. 9) during which the main mirror and the sub mirror are expected to complete their movement and have become stable, the front or preceding shutter screen electromagnet 1C is deenergized to initiate the travel of the front shutter curtain to commence the exposure. After a lapse of an exposure time TV (at the timing C4 in FIG. 9) determined by the signal received during the light measuring cycle, the rear or trailing shutter curtain electromagnet 2C is deenergized to actuate the rear shutter curtain to terminate the exposure.

When an electronic flash device 130 is connected to the accessory shoe 9 of the camera body 1, closure of a synchro switch Sx triggers the flash device 130 to fire the latter. The synchro switch Sx is adapted to close with the shutter being fully open, i.e. when the front shutter curtain completes its travel.

In the case where the still video back 2 has been removed and the camera body 1 is used as a photographic or film camera, the interruption of the flash firing is made by the flash control circuit 133. The flash control circuit 133 is supplied with the output of the photocell 25 through a light measuring circuit 132 and the data of the film speed, i.e. ISO value is supplied thereto through a D/A converter 134. When the electronic flash 130 is fired, the light reflected from an object under the illumination of the flash light passes through the camera objective lens and the diaphragm aperture and is reflected and scattered by the film plane to impinge on the photocell 25. The flash control circuit 133 integrates the light receiving signal of the photocell 25 to generate a stop signal when the integration reaches a given value commensurate with the film speed value, i.e. the ISO value, and interrupts the flash firing.

When the still video back 2 is attached to the camera body 1, the light from the object illuminated by the flash light is directly measured by the photocell PS provided in the still video back 2. The second reflecting mirror 45 in the relay optical system 38 of the still video back 2 is semi-transparent with the transmissivity of about 10%. The photocell PS for the direct light measurement is disposed at the rear of the second reflecting mirror 45 (see FIG. 2). The output of the photocell PS is applied to the flash control circuit 135 through a light measuring circuit 136 in the still video back 2 as shown in FIG. 7. The flash control circuit 135 is supplied with the data of the sensitivity of the still video back 2, as a fixed ISO value. The flash light reflected from the object is received by the photocell PS and measured by the light measuring circuit 136. As the light measurement value is obtained from the light split from the light passing though the relay optical system 38, it can be safely said that the intensity of the light received by the CCD sensor 40 is directly measured. The flash control circuit 135 integrates the light measurement and generates a stop signal for interrupting the firing of the flash device when the integration reaches a given value commensurate with the fixed ISP value. The stop signal is applied to the flash device through a flash adapter 131 interposed between the flash device 130 and the accessory shoe 9 of the camera body 1 as shown in FIGS. 3 and 6. In this case, as the relay optical system 38 transmits almost all the light, the photocell 25 in the camera body 1 receives little flash light reflected by the object so that the flash control circuit 133 in the camera body 1 does not output the flash interruption or stop signal.

After the lapse of a given time (at the timing C6 in FIG. 9) from the start of the rear shutter curtain, the time being determined to cover the time during which the rear curtain completes its travel, the release electromagnet is deenergized to open the diaphragm and lower the main and sub mirrors, and the switch S4 is turned on to supply a wind-up operation initiating signal to a motor driver mechanism. When the camera mechanism is cocked by the motor driver mechanism, or manually, the switch S4 is turned off to make the camera releaseable again.

Figure 10A:
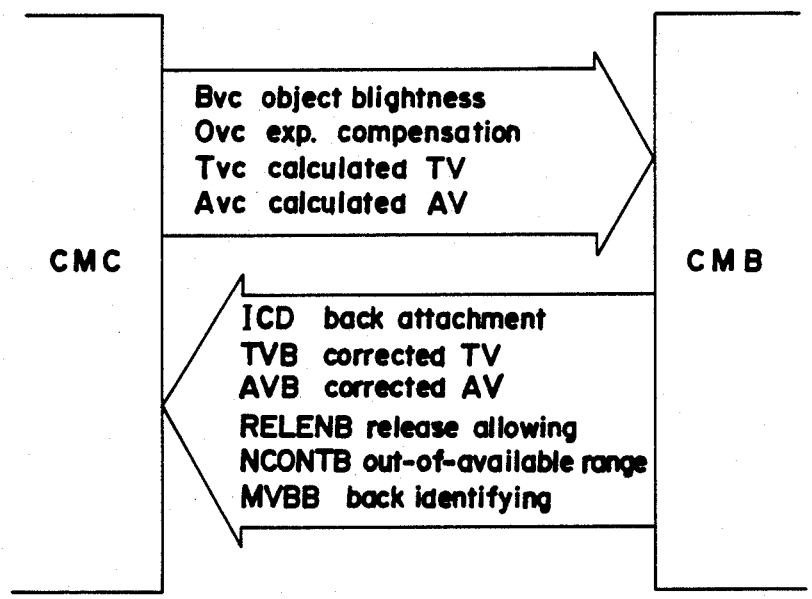
FIGS. 10(a) and 10(b) are explanatory illustrations of the signals exchanged between the camera portion and the adapter device portion.
Figure 10B:
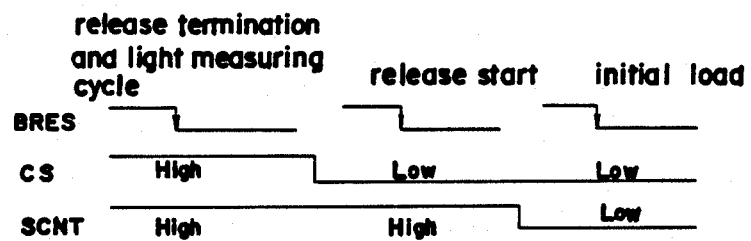

During the release operation, the camera control microcomputer CMC supplies the back control microcomputer CMB with a release start signal at the timing C1 in FIG. 9 and a release termination signal at the timing of C5 in FIG. 9. Those release start and termination signals, and the reference signal for the light measuring cycle, and a release signal at the time of the initial loading of film (the signal for the camera releasing without exposure at the initial stage after a film is loaded and is wound-up for a given length) are all supplied as the lowering or trailing edge of the signal BRES and those signals are distinguished from the others by the High or Low level of the signals CS and SCNT as shown in FIG. 10(b). The data exchanged during the light measuring cycle are shown in FIG. 10(a). The camera body 1 supplies the video bank 2 with the data of the object brightness BVC, the amount of exposure compensation OVC, the exposure time value TVC calculated in the camera body 1, and the diaphragm aperture value AVC calculated in the camera body 1. The video back 2 supplies to the camera body 1 data of the back attachment completion signal ICP, the exposure time value TVB corrected in the video back, the diaphragm aperture value AVB corrected in the video back, the release allowing signal RELENB, the out-of-available range determination signal NCONTB, and the back identifying signal MVBB. The back attachment completion signal and the back identifying signal are fixed data.

With reference to FIG. 7, the back control microcomputer CMB receives signals BRES, CS and SCNT which are generated from the camera control microcomputer. The signal BRES is to be applied to the interruption input terminal INT of the back control microcomputer such that the back control microcomputer CMB is interrupted by the dropping of the signal BRES. The signals BSCK, DSOUT and BSIN are the types of signals for serial input/output and correspond respectively to the signals SCK, SOUT and SIN in the camera body 1. As described before, the video back 2 is provided with a sensitivity data inputting pattern 56*b* to input data of ISO value SVB to the camera body 1.

The back control microcomputer CMB outputs to the still video recorder 4, a recorder actuating signal ST and a record command signal RT for interrupting the recorder control microcomputer CMR. The still video recorder 4 supplies to the still video back a cassette insertion signal PIN indicating the condition of the cassette inserted, and recording ready stand-by signal READY indicating recording available condition. The CCD signal processing circuit board 41 supplies the still video recorder 4 with the picture signal and the synchronization signal. The still video recorder 4 supplies power C for the back control microcomputer CMB and power D for the CCD signal processing circuit board 41. The signal SGEN input from the back control microcomputer CMB to the CCD signal processing circuit board 41 is the signal for allowing and inhibiting the transfer of the output of the CCD sensor. A signal CC input from the back control microcomputer CMB to the CCD signal processing circuit board 41 through D/A converter 41*a* controls the gain of a first stage amplifier for the output signal of the CCD sensor. With this signal, the gain can be changed as much as four times. Assuming that the minimum value of the gain G is $G\phi$, and define $GV = \log 2 \cdot (G/G\phi)$ ($0 \leq Gv \leq 2$), and that the ISO value of the sensitivity of the video back 2 is SVB at the time when GV=0, then the exposure parameter values can be obtained in accordance with the flowing formula:

$$TV + AV = BV + OV + SVG + GV$$

wherein OV is the amount of exposure compensation. With reference to FIG. 8, signals ST, RT, PIN and READY are exchanged between the back control microcomputer CMB and the recorder control microcomputer CMR. Signals MDCK, MDD and MDR are multiplex data control signals. Signals HE1 and HE2 control the timing of recording. A signal SPON controls turning on and off of the spindle motor 76. A signal SRON controls turning on and off of the solenoid in the head shifting drive circuit 85. A signal PSW is produced by a switch which detects whether the cassette of the still video floppy 15 has been inserted or not. A signal HRSW is produced by a switch which detects whether the head has been reset to its standard position by the closure of the cassette holder. A signal FD/FM is supplied from a switch which selects field record or frame record. A microcomputer CMCL is a calender microcomputer which supplies the recorder control microcomputer with the data of date to be recorded as a multipled data. The power source A supplies power to the recorder control microcomputer CMR. The power source B is for the signal processing circuit surrounded by a broken line in FIG. 8. The power source C supplies power to the back control microcomputer CMB, while the power source D supplier power to the CCD signal processing circuit board 41. The power sources B and D are turned on and off by a power control signal BAON from the recorder control microcomputer CMR.

Figure 11A:
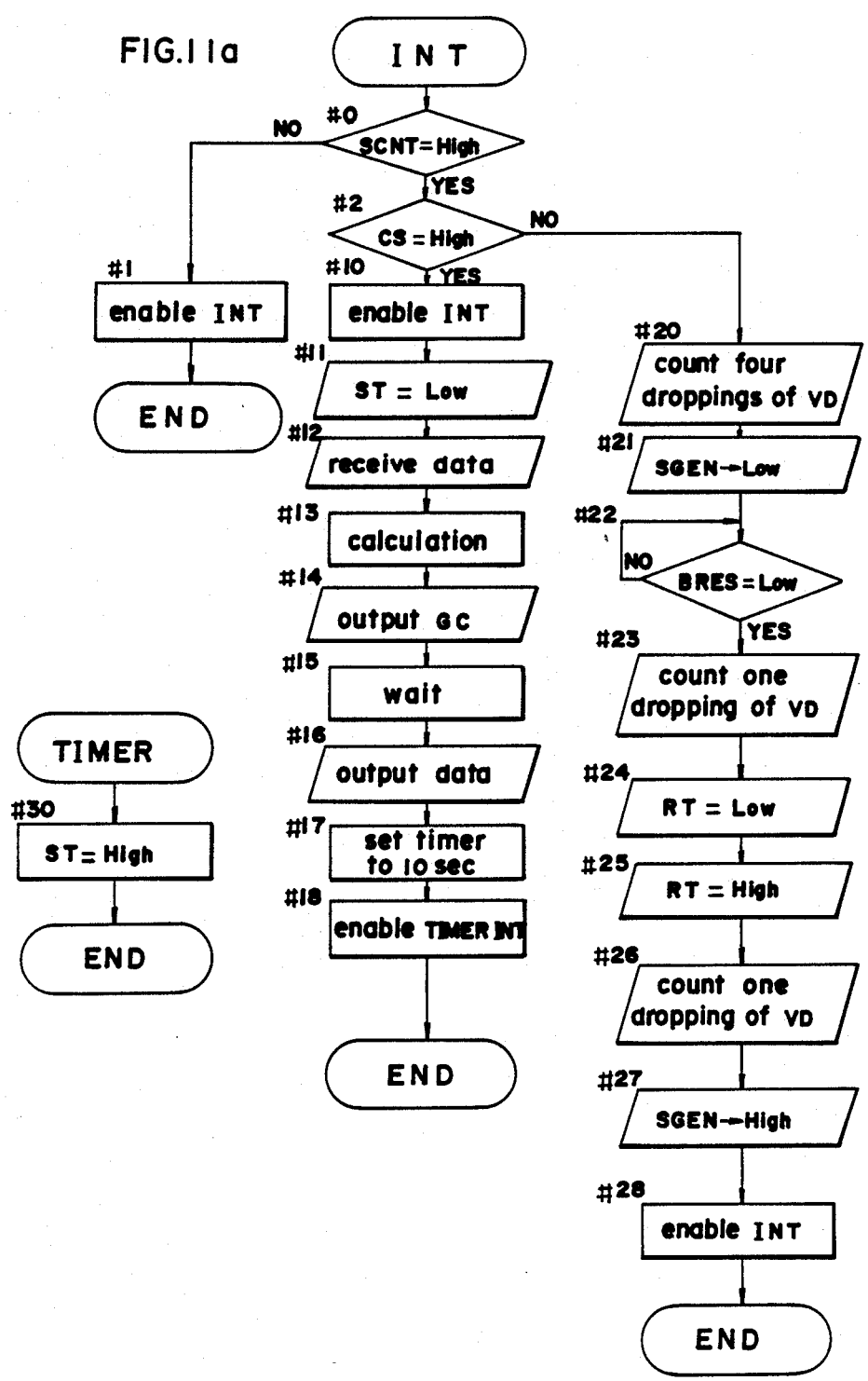
FIGS. 11(a) and 11(b) are flowcharts showing the operation of the adapter device portion.
Figure 11B:
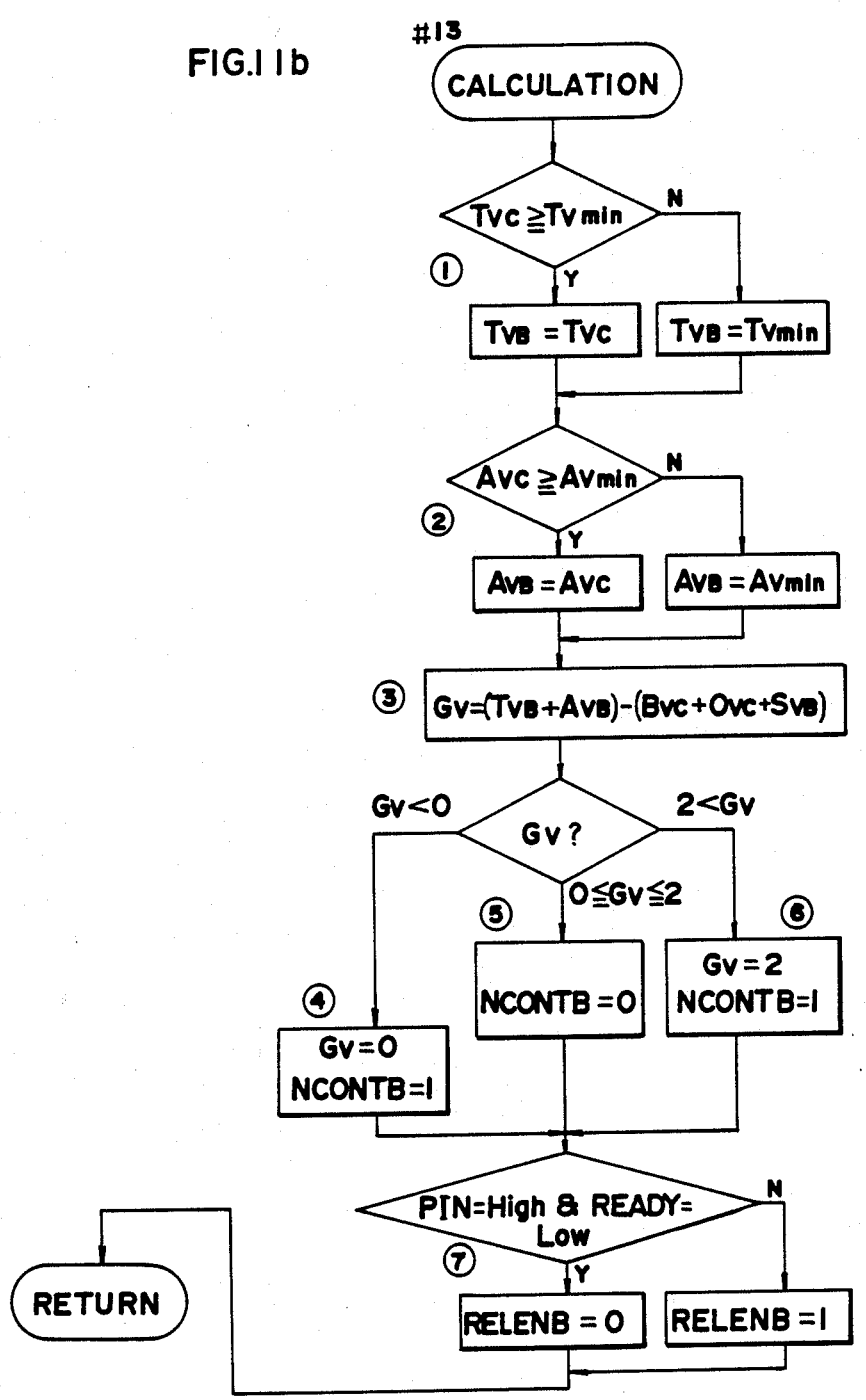
Figure 12:
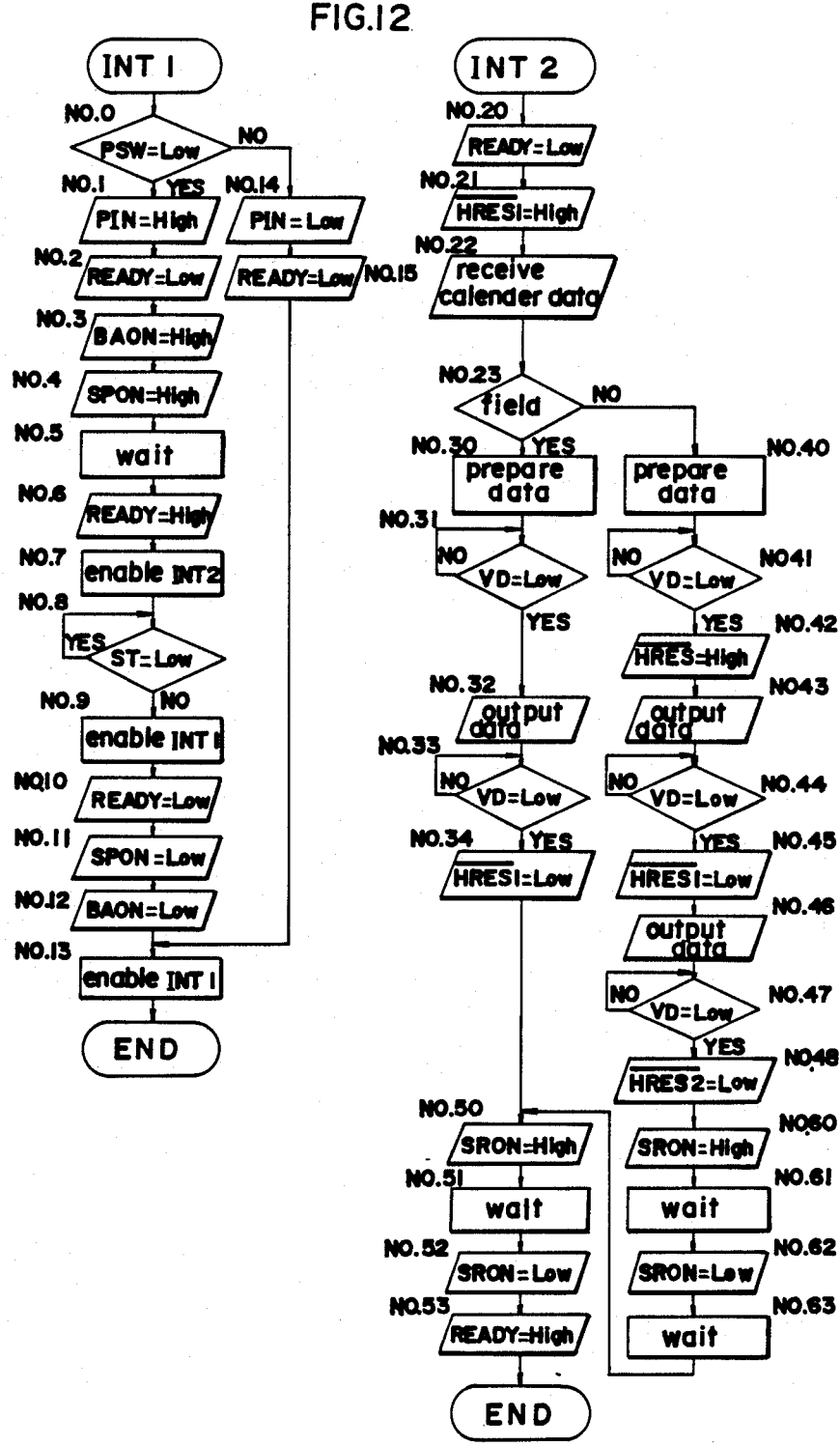
FIG. 12 is a flowchart showing the operation of the video recorder.

With reference to the flowchart of FIG. 11 showing the operation of the back control microcomputer CMB and the flowchart of FIG. 12 showing the operation of the recorder control microcomputer CMR, when the light measuring cycle is started in the camera body 1 to make the signal BRES a low level, the back control microcomputer CMB is interrupted to jump to step #11 to make the recorder actuating signal ST a low level. The inversion of the recorder actuating signal ST from a high to a low level interrupts the recorder control microcomputer CMR which jumps to the step No.0 shown in FIG. 12 to detect the existence of the still video back 2. If the back exists (PSW=Low), the computer proceeds to step No.1 to make the cassette insertion signal PIN a high level showing the existence of a cassette, make the recording ready signal READY a low level, turn on the powers B and D (step No.3) and energize the spindle motor 76 (step No.4). After a lapse of a given time covering the rising time of the power sources and the motor, the recording ready signal READY is made a high level (step No.6) and the microcomputer waits for another interruption signal INT2 (dropping of the recording command signal RT) when the recorder actuating signal ST is at a low level (steps Nos.7 and 8). If any cassette does not exist at step No.0, the process jumps to step No.14 to make the cassette insertion signal PIN a low level and the recording ready signal READY a low level, and then stops.

After making the recorder actuating signal ST a low level, the back control microcomputer CMB receives from the camera body 1 the data shown in FIG. 10*a* (step #12) and calculates data to be returned to the camera body and the gain control data CC from the received data (step No.13).

The algorism for the calculation is shown in the flowchart of FIG. 11(*b*). At step ①, a back corrected exposure time value TVB is determined. If the exposure time value TVC determined in the camera body 1 is shorter than the longest limit value TVmin due to dark current noise, TVB=TVC, otherwise TVB=TVmin. At step ②, the back corrected aperture value AV is determined. If the aperture value AVC determined in the camera body is smaller than the diaphragm aperture size representing value of a limit full open aperture value due to the relay optical system 38, AVB=AVC, otherwise AVB=AVmin. At step ③, $GV=(TVB+AVB)-(BVC+OVC+SVS)$ is calculated. At steps ④, ⑤ and ⑥, the signal NCONTB is made 1 to show out-of-range with the calculated value GV being limited if the calculated value GV is beyond the available range (0–2). If the calculated value GV is within the range, the signal NCONTB is made 0 showing within the range. At this time, if the values calculated in the camera body 1 are within the ranges of TV and AV allowed by the video back 2, TVB=TVC, AVB=AVC, GV=0 and NCONTB=0. The signal NCONTB represents within (by 0) or outside (by 1) of the available range. At step ⑦, the signal RELENB is made 0 to inhibit camera release if the back exists (cassette insertion signal PIN=High) but the power source and the motor are in rising condition (recording ready signal READY=Low). Otherwise, the signal RELENB is made 1 to allow the camera release. The signal RELENB represents allowance of the camera release by 0 and inhibition by 1.

When the above described calculations are completed, a gain control data GC is output to the CCD signal processing circuit board 41 (step #14), and the corrected value and the condition signals (see FIG. 9(*a*)) are supplied to the camera body (step #16). Then, timer interruption is enabled and the operation is terminated steps #17 and #18). While the light measuring cycle is repeated, the above steps #0 to #18 are repeated. When the light measuring cycle is terminated, the time interruption makes the operation jump to step #30 wherein the recorder actuation signal ST is made a high level and the operation is terminated to return to the initial condition. When the recorder actuating signal ST is made a high level, the recorder control microcomputer CMR jumps to step No.9 to inhibit the receipt of the recording command signal RT (inhibit the receipt of the signal INT2), make the recording ready signal a low level and turn off the spindle motor 76, power sources B and D and returns to the initial condition steps No.11 to No.13).

If the release switch S2 is closed after camera release is allowed in the light measuring cycle, the camera body 1 performs the release operation and generates a release start signal at the timing C1 in FIG. 9. The release start signal causes interruption of the back control microcomputer CMB (step #0) which jumps to step #20. At step #20, droppings of four times of the vertical synchronizing signals VD are counted and the transfer allowing signal G is changed from a high to a low level (step #21 in FIG. 11(a) and at the timing B1 in FIG. 9). When the transfer allowing signal SGEN becomes a low level, the transfer clock pulses SG1 and SG2 for the CCD are gated. The clock pulses SG1 and SG2 serve to transfer to the vertical shift register the charges stored at the odd field and even field of the photoelectric converter section respectively. The clock pulses SG1 and SG2 transfer one field by one field in turn. With this, in the condition where the shutter is closed and the transfer allowing signal SGEN is at a high level, dark current is output. When the transfer allowing signal SGEN is made a low level, the transfer clocks SG1 and SG2 for the CCD are blocked and the term after the last pulses (BS1 and BS2 in FIG. 11) will be exposure available term. Then, the release termination signal is waited for (step #22 in FIG. 11). During this time, the output of the CCD includes smear component leaking from the photoelectric converter section to the vertical shift register. When the release termination signal arrives (at timing C5 in FIG. 9), the dropping of the vertical synchronizing signal VD is counted by one (step #23 of FIG. 11(a)) and the recording command signal RT is made low (steps #24 and #25 in FIG. 11(a)). Then the dropping of the vertical synchronizing signal VD is counted by one again (step #26 in FIG. 11(a)) the transfer allowing signal SGEN is made a high level (step #27 in FIG. 11(a), at the timing B3 in FIG. 9). When the transfer allowing signal is made a high level, the transfer clock pulses SG1 and SG2 become active so that a photographed picture signal for one frame is produced. When the recording command signal RT is made a low level at step #24, the recorder control microcomputer MCR is interrupted to jump to step No.20. The recorder control microcomputer CMR receives calendar value data from the calendar control microcomputer CMCL (at step No.22) and performs field recording or frame recording in accordance with the FD/FM signal (No.23). By steps No.30 to No.34, the field recording is made, whereas the frame recording is made by the steps No.40 to No.48. The head moving solenoid is controlled by the steps No.50 to 52 and No.60 to No.63 so that the head is displaced by the distance of one truck (No.50 to No.52) in the case of the field recording and two trucks (No.60 to 63, No.50 to 2) in the case of the frame recording.

As described above, in the preferred embodiment according to the present invention, a splitting member splits the light to be incident onto the image sensor for the still video photography into two groups, one being directed to the image sensor and the other to the photocell for the flash light control. Split light directed to the photocell, the amount of which being in proportion to that directed to the image sensor, is measured as the amount of light actually incident onto the image sensor. Accordingly, by integrating the output of the photocell and generating a signal for the interruption of the flash light emission when the integrated value reaches a given value, it is able to properly control the amount of flash light emission.

Moreover, the still video adapter device is provided with a camera interface circuit which receives the exposure data Tvc and Avc set in the camera body and determines whether at least one of the received data is within or without the given range corresponding to the back available exposure range such as the longest limit exposure time due to dark current noise of the image sensor and the limit full open aperture value due to the relay optical system. In case where at least one of the received data is out of back available range, the camera interface circuit corrects the received exposure data so as to restrict within the range and returns to the camera corrected exposure data and a signal for the indication showing exposure data set in the camera body being out of the back available range. Accordingly, in case where the exposure data set in the camera body is inappropriate for the still video photography using the still video adapter device, it is able to correct the exposure data or warn the inappropriateness to the camera body thereby preventing the failure of the exposure due to inappropriate exposure data.

Additionally, as described above, in the preferred embodiment, the operations of the still video adapter device are controlled by signals fed from the camera body representing the operations of the camera body such as a light measurement start signal, a release start signal and a release termination signal. On the other hand, release operation of the camera body is controlled by a signal fed from the still video adapter device representing the recording ready condition of the still video adapter device such as a release inhibit signal to inhibit the camera release during a given time covering the rising of the image sensor and the spindle motor. That is, power to the CCD image sensor and the spindle motor are begun to supply so as to start each operation thereof in response to the light measurement start signal. At the same time, the still video adapter device outputs to the camera body the release inhibit signal to inhibit the camera release. If a release switch is closed after a lapse of the given time, the camera body performs the release operation and generates to the still video adapter device the release start signal which in turn makes the image sensor in condition for charging. When the release termination signal is generated in response to the termination of the exposure, the output of the CCD image sensor includes only smear component leaking from the photoelectric converter section to the vertical shift register of the CCD image sensor due to the high brightness portion projected onto the photoelectric converter section during the exposure because the transfer of the charges stored in the photoelectric converter section to the vertical shift register section of the CCD image sensor is inhibited. After the output of the smear component, the transfer is allowed such that the CCD image sensor output charges stored in the photoelectric converter section during exposure which in turn are used as picture signals for the recording.

Accordingly, as the powers to the CCD image sensor and the motor requiring relatively large power are not supplied when the camera body is not in light measuring operation and are automatically supplied in response to the light measurement start, it is able to reduce the power consumption in comparison to the case where the powers thereto are supplied simultaneously with the power supply to the camera body. It is also able to make higher the possibility that the CCD image sensor and the motor are in stable condition at the timing of camera release thereby ensuring proper photography. Furthermore, as the camera release is inhibited while the CCD image sensor and the motor are not in a stable state, i.e., during a time covering the rising thereof, thereby preventing the failure of the photography due to the unstable operation thereof. Additionally, it is able to eliminate the smear component by carrying out the output of the smear component leaking from the photoelectric converter section in advance of the transfer of the picture signals at the termination of the exposure. Also, the release termination signal generated from the camera body is used for the output of the smear component and then for the transfer of the picture signals, a timing signal generator exclusively for the elimination of the smear component is not needed, thereby permitting the circuit construction simple to be and easy.

Furthermore, as described above, in preferred embodiment, a positioning member, to be positional with respect to the exposure frame of the camera body and fixed to an optical base plate accommodating the optical system and the CCD image sensor, has a shutter member for the protection and dust-proofing for the optical system of the still video adapter device. It is able to precisely position the optical system and the CCD image sensor against the exposure frame of the camera body and to prevent the optical system such as a condenser lens to be accidentally touched by a finger of a user or to have dust on the surface thereof.

Additionally, as described above, as the still video adapter device is provided with a data inputting member which has an electrical pattern representing the sensitivity of the still video adapter device converted into the unit of the film speed and is operable to move to a position where the pattern is brought into contact with the contacts on the camera body for automatically reading the film data formed on the film cartridge when the still video adapter device is mounted to the camera body. Accordingly, the sensitivity of the still video adapter device corresponding to the film speed of the film cartridge is automatically input to the camera body and thereby preventing the mis-setting of the sensitivity of the still video adapter device.

While there has been described a preferred form of the invention, obviously modifications and variations are possible in light of the above teachings. It is therefore to be understood that within the scope of the appended claims, the invention may be practiced otherwise than as specifically described.

What is claimed is:

1. A still video adapter device detachably mounted to a back portion of a camera body in place of a rear cover, said camera body being adapted for film exposure and including an objective lens, means for detachably mounting an electronic flash device, and a first light receiving means for receiving light passing through said objective lens and reflected by the surface of a film with said rear cover attached and for generating an output used for controlling the amount of flash light emission of said electronic flash device, said still video adapter device comprising:
   an image sensor;
   an image sensor control circuit for controlling the operation of said image sensor such that said image sensor outputs picture signals for still video photography;
   a relay optical system for relaying and reimaging on said image sensor an image formed by said objective lens on a plane where film would normally be located;
   means for splitting light entering said relay optical system through said objective lens, and directing a portion thereof onto said image sensor; and
   second light receiving means disposed so as to receive another portion of the light split by said splitting means for generating an output used for controlling the amount of flash light emission of said electronic flash device, the amount of flash light emission being controlled in accordance with the output of said first light receiving means when said rear cover is mounted to said camera body, and controlled in accordance with the output of said second light receiving means when said still video adapter device is mounted to said camera body.

2. A still video adapter device detachably mounted to a back portion of a camera body in place of a rear cover, said camera body being used for film exposure with said rear cover attached, said device comprising:
   an image sensor which outputs picture signals for still video photography;
   a relay optical system, including a condenser lens, an image forming lens, a first reflecting mirror and a second reflecting mirror, for relaying and reimaging on said image sensor an image on a plane where film would normally be located in said camera body, one of said first and second reflecting mirrors being a half mirror for splitting light incident thereto and directing a portion thereof onto said image sensor; and
   a light receiving means disposed so as to receive another portion of the light split by said half mirror for generating an output used for still video photography.

3. A still video adapter device as in claim 2, wherein said image forming lens and first and second reflecting mirrors are arranged in the order of first reflecting mirror, image forming lens, second reflecting mirror and image sensor, and said second reflecting mirror is said half mirror.

4. A still video adapted as in claim 3, wherein said image sensor is disposed so as to receive light reflected by said half mirror and said light receiving means is disposed so as to receive light passing through said half mirror.

5. A still video adapter device as in claim 2, wherein said image sensor is disposed so as to receive light reflected twice by said first and second reflecting mirrors, respectively.

6. A still video camera system, comprising:
   a camera body including an objective lens, a first light receiving means for receiving light reflected from a film surface when a rear cover carrying film is mounted on said camera body and for generating a first signal indicative of intensity of said reflected light, and a first flash control means for integrating said first signal and for generating a second signal when integration of said first signal reaches a predetermined value;
an electronic flash device mounted on said camera body; and
a still video back mounted on said camera body and including:
  a low reflectance optical system for redirecting and focussing light passing through said objective lens;
  an image sensor, positioned to receive light from said optical system, for producing electronic image signals indicative of a plurality of intensity of incident light;
  second light receiving means for receiving light from said optical system and for generating a third signal indicative of intensity of received light; and
  second flash control means for integrating said third signal and for generating a fourth signal when integration of said third signal reaches a predetermined value;
said electronic flash device being responsive to said fourth signal to crease light emission, said first light receiving means receiving insufficient light as reflected by said optical system to cause generation of said second signal prior to generation of said fourth signal.

7. A still video camera system as in claim 6, further comprising an adapter means, interposed between said camera body and said electronic flash device, for mounting said electronic flash device on said camera body, and for providing electrical connections between said electronic flash device and said first flash control means, and between said electronic flash device and said second flash control means.

* * * * *